United States Patent Office 3,437,643
Patented Apr. 8, 1969

---

3,437,643
UNSATURATED DICARBOXYLIC ACID HALF ESTER RESIN COMPOSITION
Robert L. Zimmerman, Midland, Mich., assignor to The Dow Chemical Company, Midland, Mich., a corporation of Delaware
No Drawing. Continuation-in-part of applications Ser. No. 82,720, and Ser. No. 82,722, Jan. 16, 1961. This application Mar. 19, 1965, Ser. No. 441,310
The portion of the term of the patent subsequent to Sept. 21, 1982, has been disclaimed
Int. Cl. C08f *19/10, 19/02*
U.S. Cl. 260—78.5        22 Claims

ABSTRACT OF THE DISCLOSURE

Homogeneous copolymers of monovinyl aromatic compounds and partial esters of maleic acid and methods of preparing said copolymers by partially esterifying a vinyl aromatic-maleic anhydride copolymer or by partially esterifying maleic anhydride and thereafter copolymerizing with the desired vinyl aromatic monomer.

---

This application is a continuation-in-part of copending applications, Ser. Nos. 82,720 and 82,722, filed Jan. 16, 1961, both cases now abandoned.

The present invention relates to novel resinous compositions and a method for preparing the same and is more particularly concerned with new homogeneous, transparent copolymers the essential ingredient of which is a member of the group consisting of from 80 to 98 mole percent of at least one monovinyl aromatic compound chemically combined with from 2 to 20 mole percent of maleic acid which is partially esterified with a member of the group consisting of alkyl alcohols containing from 1 to 18 carbon atoms and cycloalkyl alcohols and from 65 to 98 mole percent of at least one monovinyl aromatic compound chemically combined with from 35 to 2 mole percent of an alkylene oxide monoether alcohol (containing 1 or 2 ethylene, propylene or butylene oxide groups) partial ester of maleic acid. The preferred mole ratios are from 95 to 80 mole percent vinyl aromatic compound and from 5 to 20 mole percent of the alkylene oxide partial ester.

The new resins of the present invention may be prepared by partially esterifying a corresponding vinyl aromatic-maleic anhydride copolymer, or by partially esterifying maleic anhydride, and thereafter copolymerizing with the desired vinyl aromatic monomer in the manner hereinafter described. Highly utile products are obtained employing an esterification of from about 10 to about 60 mole percent, where 100 mole percent would represent the diester.

Alcohols which may be employed to esterify the maleic anhydride include primary and secondary alkyl alcohols containing from 1 to 18 carbon atoms and cycloalkyl alcohols such as, for example, cyclohexyl alcohol, cyclopentyl alcohol, substituted cycloalkyl alcohols and the like.

Alkylene oxide mono ether alcohols which are useful for forming the partial esters of maleic acid have the general formula:

$$R(OC_nH_{2n})_mOH$$

wherein $n$ equals an integer from 2 to 4 inclusive, $m$ equals 1 or 2, and R equals an alkyl radical containing from 1 to 8 carbon atoms, monocycloalkyl, or mononuclear aromatic radical or a $C_1$ to $C_8$ substituted aromatic radical such as di-secondary butylphenyl, benzyl, phenylethyl, tolyl and the like. The molecular weight of such ether alcohols is less than 250, preferably less than 200. Examples of such ether alcohols include 2-methoxy ethanol; 2-ethoxy ethoxy ethanol; 2-butoxy ethanol; diethylene glycol methyl, ethyl, propyl and butyl ethers; propylene glycol methyl ether; dipropylene glycol methyl ether and the like.

The partial esters may be made in any convenient manner. Advantageously, the desired amount of the alkylene oxide ether alcohols is reacted with the maleic anhydride at about 60° C. until a constant refractive index is obtained.

Vinyl aromatic compounds which are useful include, for example, styrene, vinyltoluene, chlorostyrene, vinyl xylenes, and the like.

Any peroxide or hydroperoxide catalyst such as benzoyl peroxide, di-t-butyl peroxide, lauroyl peroxide, cyclohexanone peroxide, hydroxy heptyl peroxide, dicumyl peroxide, t-butyl hydroperoxide, methyl ethyl ketone peroxide, p-methane hydroperoxide, cumene hydroperoxide or mixtures thereof may be employed. The catalyst chosen should have a half life of from a few minutes to two hours at the reaction temperature.

The products of the present invention may be prepared by a process which comprises the linear addition of from 100 to 65, preferably 90 to 70, weight percent of a mixture of the partially esterified maleic acid and polymerization catalyst, with or without the preseence of a solvent therefor, to a solution of the vinyl aromatic monomer and from 0 to 35, preferably 10 to 30 weight percent of the partially esterified maleic acid and catalyst in proportion to the amount of acid maleate in a solvent therefor at a temperature of from 90° to 200° C., preferably 120 to 150° C. at a rate such that the addition is completed when the polymerization has reached 70 to 85 percent conversion of all monomers to copolymeric product. It is desirable that at least 10 weight percent of the half ester be admixed with the vinyl aromatic monomer prior to heating to polymerization temperatures.

These products may also be prepared in a continuous process such as that illustrated in U.S. Patent 2,769,804 or copending application Ser. No. 33,376, filed June 2, 1960.

If prepared in accordance with the linear addition process, the product which has reached 60 to 70% conversion may be removed from the polymerizer and the polymerization thereafter completed to produce a clear, essentially homogeneous product.

The catalyst and reaction temperature should be chosen such that the initial rate of polymerization is from 10 to 30% per hour, preferably 12 to 20% per hour. From 0 to 5%, preferably from 0.5 to 2.0%, by weight, based on total monomers, of catalyst may be employed.

The rate of addition must be such that the addition is completed when the polymerization has reached from 60 to 90%, preferably 70 to 85%, conversion of all monomers to copolymeric product as determined by percent solids run at 2 mm. for 1 hour at 140° C. The feed time at constant rate is from about 0.5 to 2.5 hours, generally being about 1.0 to 2.0 hours.

The solvents which may be employed are, for example, benzene, toluene, xylene, methyl ethyl ketone, methyl isobutyl ketone, methyl propyl ketone, diacetone alcohol, diethyl ketone, ethyl isopropyl ketone, mixtures thereof, and the like. Alcohols such as propanol, butanol, pentanol, hexanol, octanol, and the like, may also be employed, but are best used in admixture with a ketone or aromatic solvent. If used as a solvent for the maleic acid-catalyst addition mixture, such alcohol is most advantageously the same alcohol which was used to esterify the maleic acid. The amount of solvent in the feed mixture is preferably that amount which will provide a constant percent, preferably 50 to 65%, of monomer in the solvent in the polymerizer.

When prepared by either the continuous or linear addition methods the half ester containing copolymers of this invention may be converted to half ester and anhydride containing terpolymers by devolatilizing at temperatures between about 150° and 300° C.

The compositions of the present invention are homogeneous and transparent, i.e., essentially uniform, soluble in aromatic solvents, insoluble in aqueous alkali and ammonia, and have surprisingly high softening temperatures. They must be injection molded, and are useful in making plastic articles such as cups, tags, rings, toys, etc. They may be employed as adhesives, and are useful as thickening agents for paraffinic and aromatic solvents. The alkylene oxide partial ester copolymers are particularly useful in lacquer coatings, thermosetting coatings, paper coatings and floor polishes.

The present invention may be further illustrated, but is not to be construed as limited by the following examples.

EXAMPLE I

Decyl acid maleate was prepared by stirring equimolar amounts of decyl alcohol and maleic anhydride at room temperature until the maleic anhydride dissolved. To 300 g. decyl acid maleate were added, 140 g. xylene, 4.5 g. t-butyl hydroperoxide, and 4.5 g. di-t-butyl peroxide. This solution was pumped uniformly over 98 minutes into a 3 liter flask which contained at the start 900 g. of vinyltoluene and 660 g. xylene heated to 130° C. The flask was fitted with a mechanical stirrer, reflux condenser, sampling port, and viscosimeter, and was supplied with nitrogen for purging the system and then blanketing the reaction.

The reaction was terminated after a total reaction time of 318 minutes. The resulting solution was crystal clear and was 57.3 percent solids. A portion of devolatilized polymer was made up 10 percent in methyl ethyl ketone. At 25° C., this solution had a viscosity of 1.72 cps. The devolatilized polymer had a Vicat softening point of 78.0° C.

EXAMPLE II

Isooctyl acid maleate was prepared as in Example I. A solution of 20 percent isooctyl acid maleate in styrene was fed into a polymerization system similar to that illustrated by FIGURE 2 of the drawing in U.S. 2,769,804. The polymerizer was maintained at approximately 176° C. A major portion of the polymerization mixture was recirculated through the polymerizer. A minor portion of the mixture from the polymerizer was passed to a devolatilizing device where it was heated to approximately 210° C. at from 85–90 millimeters absolute pressure to vaporize volatile components and convert a portion of the combined half ester to maleic anhydride. The volatile materials thus removed from the copolymer were condensed and recycled into admixture with the incoming feed of styrene and ethyl acid maleate and returned to the polymerizer. The devolatilized copolymer, which constituted about 30 percent of the monomer-polymer effluent from the reactor, was extruded in continuous flow from the devolatilizing device and collected.

Start-up of the process was achieved by polymerizing styrene alone and then switching to the above feed solution. Change-over to steady state conditions was achieved in about 8 hours. The copolymer was analyzed by titration with methanolic KOH of a polymer solution in dry acetone. The analysis indicated an isooctyl acid maleate content of 20.5 percent. The clear, straw-colored product contained 1.58 percent volatile material and was soluble in xylene and methyl ethyl ketone. A 10 percent solution in the latter solvent had a viscosity of 3.57 cps.

EXAMPLE III

Products were made as in Example II and analyzed by titration with methanolic KOH and by hydrolysis in pyridine solution followed by titration with aqueous base in order to determine the relative amounts of polymerized maleic anhydride and isooctyl acid maleate.

| Sample Number | Percent Volatile | 10% solution Visc. in MEK | Vicat, ° C. | Mole percent Styrene (S) | Mole percent Maleic Anhydride (MA) | Mole percent Acid Maleate (MHE) |
|---|---|---|---|---|---|---|
| (1) i-Octyl acid maleate | 1.5 | 4.7 | 96 | 95.5 | 1.8 | 2.7 |
| (2) i-Octyl acid maleate | 2.5 | 4.2 | 100 | 90.4 | 6.1 | 3.5 |
| (3) i-Octyl acid maleate | 2.5 | 2.8 | | 82.1 | 11.2 | 6.7 |
| (4) i-Octyl acid maleate | 2.1 | 2.7 | | 91 | 1.9 | 7.1 |
| (5) i-Octyl acid maleate | 1.7 | 14.9 | 96 | 97.5 | 0.3 | 2.2 |
| (6) Butyl acid maleate | 4.1 | 6.8 | 90 | 91.1 | 5.4 | 3.5 |

Sample 6 was readily injection molded into test bars and tested. Tensile: 5,900 p.s.i.; elongation: 2.5%; impact: 0.32 ft.-lbs./in. notch;

| Sample | Tensile | Elongation | Impact |
|---|---|---|---|
| 1 | 5,190 | 2.1 | 0.26 |
| 2 | 5,160 | 1.9 | 0.18 |
| 5 | 6,880 | 3.0 | 0.37 |

EXAMPLE IV

A sample of a styrene-maleic anhydride copolymer containing 14.2 weight percent maleic anhydride was prepared according to the procedure of copending application Ser. No. 33,376, filed June 2, 1960, using methyl ethyl ketone as a solvent.

To 100 parts of the copolymer was added 23.8 parts of decyl alcohols and the mixture was heated to 200° to 230° C. for 1 hour under a nitrogen blanket with agitation. A homogeneous melt formed that cooled to a rigid resin. A solution of a sample of this resin in pyridine was heated with a small amount of water to hydrolyze any anhydride groups. Titration with sodium butoxide in butanol indicated 97 percent reaction to half ester.

EXAMPLE V

A copolymer of vinyltoluene with 13 mole precent or 22.5 weight percent n-octyl acid maleate was prepared at 50 percent solids in benzene by the procedure of Example I. The solution was devolatilized at 80° C. in vacuo to recover the solid polymer. This resin had a Vicat softening temperature of 103° C. and a 10 percent solution in MEK had a viscosity of 3.66 cps. The melt viscosity at varying temperatures and a pressure of 530 p.s.i. (using a 16½ inch die having a diameter of 0.0384 inch) was determined for this polymer. The results are given in the following table.

| Run | Temperature, ° C. | Melt Viscosity |
|---|---|---|
| 1 | 210 | Unable to obtain |
| 2 | 230 | 2,980 |
| 3 | 230 | [1] 910 |
| 4 | 250 | 79 |
| 5 | 230 | [2] 1.67 |
| 6 | 210 | [2] 1,055 |

[1] This viscosity was taken on the fourth pass at 230° C., i.e. about 12 minutes after that of Run 2.
[2] These viscosities were taken on cooling down.

The data in the above table show the unique advantage offered by the copolymer products of the present invention in that highly rigid material may be heated for a time and then extruded into a desired form after which, upon cooling, the original strength returns to the extrude.

In this manner strong products not otherwise obtainable by extrusion techniques may be conveniently and readily prepared.

This invention thus provides a process for in situ externally plasticizing, for ease of extrusion, a normally high melt viscosity polymer, i.e., a chemically bound portion of the polymer is released upon heating, whereby the polymer is externally plasticized. After cooling the reverse chemical reaction occurs and the polymer acquires its original content and properties.

EXAMPLE VI

A series of samples were prepared by essentially the procedure of Example I and the Vicat softening temperature was determined.

| Sample | Vinyl Aromatic | Acid Maleate (AM) | Mole Percent AM | Vicat Temperature, °C. |
|---|---|---|---|---|
| 1 | S |  |  | 84 |
| 2 | S | Butyl | 5.7 | 92 |
| 3 | S | do | 10.7 | 113 |
| 4 | S | do | 19.5 | 106 |
| 5 | S | Cyclohexyl | 13.2 | 86 |
| 6 | S | x-Octyl | 13.2 | 81 |
| 7 | S | 2-ethylhexyl | 8.3 | 83.5 |
| 8 | S | do | 12.0 | 82 |
| 9 | S | n-Octyl | 13.2 | 88 |
| 10 | S | x-Tridecyl | 13.0 | 79 |
| 11 | S | n-Octadecyl | 13.0 | 35 |
| 12 | VT | Butyl | 7.8 | 88 |
| 13 | VT | do | 18.6 | 88 |
| 14 | VT | n-Octyl | 13.0 | 80.5 |
| 15 | VT | x-Decyl | 13.2 | 78 |
| 16 | VT | n-Dodecyl | 9.4 | 53 |
| 17 | VT | x-Tridecyl | 13.0 | 62 |
| 18 | VT | n-Octadecyl | 20.0 | 49 |
| 19 | DCS | x-Octyl | 20.0 | 71 |
| 20 | t-BS | x-Decyl | 13.0 | 129 |

EXAMPLE VII

The procedure of Example IV was employed to prepare a series of acid maleate copolymers from different alcohols. These reactions were run in xylene solution followed by vacuum devolatilization. The base polymer used contained 15.8 weight percent of maleic anhydride (MA); 2.52 percent volatile; and had a solution viscosity of 4.2 cps.

| Sample | Alcohol | Vicat, °C. | Mole Percent Analysis | | |
|---|---|---|---|---|---|
| | | | MA | MHE | S |
| 1 | Butyl | 110 | 6.9 | 1.2 | 91.9 |
| 2 | Ethyl | 115 | 7.6 | 1.1 | 91.3 |
| 3 | Methyl | 114.5 | 7.6 | 1.7 | 90.7 |
| 4 | Water | 116 |  |  |  |

EXAMPLE VIII

To 25.0 kg. of a solid copolymer of 13.6 mole percent maleic anhydride with styrene having a solution viscosity of 3.49 cps.—10% in MEK dissolved in 29.72 kg. of 90/10 weight ratio of xylene and methyl ethyl ketone was added 4.72 kg. of x-octyl alcohol (isooctyl alcohol from "oxo" process) and 150 g. of p-toluene sulfonic acid. This solution was mixed at ambient temperature for one week to form the polymeric half ester.

Tin plate and aluminum test panels were coated with the resulting solution. After air drying for several days the panels were subjected to tests for coating properties. Surprisingly, the coatings exhibited good xylene resistance. They had excellent gloss.

EXAMPLE IX

A solid transparent copolymer consisting of 13.6 mole percent maleic anhydride and, correspondingly, 86.4 mole percent styrene was reacted with an equivalent amount of isooctyl alcohol as in Example III and was injection molded at 325° F. both top and bottom heaters in a 10 gram laboratory injection molding machine.

EXAMPLE X

The styrene-maleic anyhdride copolymer of Example IX was reacted with 12.5, 25, 37.5 and 50 mole percent of amyl alcohol dried over calcium hydride. The reaction was carried out in benzene solution at 40% solids using 1% toluene sulfonic acid as catalyst. The following observations were made:

Mole percent ester:          Appearance
12.5 ———————————— Very viscous solution.
25 ———————————— Immobile gel.
37.5 ———————————— Immobile gel.
50 ———————————— Very viscous solution.

These solutions were diluted to 10% solids and the absolute viscosities measured. Also portions were carefully devolatilized at room temperature and made up at 10% solids in toluene and benzene. Viscosities were also determined in methyl ethyl ketone solution at 10% solids to show that the abnormal viscosity behavior of the half ester copolymers is not attributable to molecular weight.

| Sample | Theoretical Mole percent Ester* | Viscosity of Devolatilized Polymer in— | | |
|---|---|---|---|---|
| | | MEK | Toluene | Benzene |
| 1 | 0 | 3.5 | 7.9 | 10.5 |
| 2 | 12.5 | 2.6 | 63.2 | 85.1 |
| 3 | 25 | 2.6 | 99.0 | 105 |
| 4 | 37.5 | 2.6 | 119 | 94.2 |
| 5 | 50 | 2.6 |  | 75.9 |
| 6 | 100 | 0.74 | 1.3 | 1.75 |

*100 mole percent represents the diester.

Sample 6 above was prepared by dissolving 300 g. of the styrene-maleic anhydride copolymer of Example IX in 200 g. benzene, adding 57.3 g. (1.5 moles/mole anhydride) amyl alcohol plus 1 g. toluene sulfonic acid and then refluxing with an azeotrope head to remove water. After 20 hours, 2.6 cc. of water were obtained. The resulting polymer solution was 52.8% solids. Titration with alcoholic KOH indicated 1.024 milliequivalents COOH/gram. A sample heated with water in pyridiene titrated 1.372 milliequivalents COOH/gram. These results calculated 3.41 weight percent maleic anhydride and 12.6 percent amyl acid maleate. For the percent diester in Sample 6 it was assumed that all the alcohol reacted as indicated by infrared. The weight percent of diamyl maleate, by difference, was 5.37.

Sample 7 was prepared by copolymerizing 171 g. styrene and 79 g. diamyl maleate in 250 g. benzene at reflux using 2.5 g. benzoyl peroxide and 2.5 g. t-butyl hydroperoxide as catalysts for 26 hours.

A similar comparison of the isooctyl alcohol half ester at 10 percent solids in toluene is given in the table.

| Sample | Mole percent Ester | Viscosity in toluene, cps. |
|---|---|---|
| 1 | 0 | 7.92 |
| 2 | 50 | 90.4 |

EXAMPLE XI

Equimolar amounts of maleic anhydride and the listed alkylene oxide ether alcohols were reacted at about 60° C. until a constant refractive index was obtained. The half acid maleates which formed were all oily liquids of a light yellow to orange or amber color. They were soluble in acetone, 95% ethyl alcohol, xylene, and 1% NaOH and were insoluble in kerosene. In the table the column headed Acid Maleate Eq. Wt. represents the acid maleate molecular weight calculated from the experimentally determined hydroxyl content of the alcohol.

| Ether Alcohol | Acid Maleate Eq. Wt. | Water Solubility | $n_D$ 25° C. | Absolute Viscosity at 25° C. in cps. |
|---|---|---|---|---|
| Ethylene glycol methyl ether | 182.3 | Sol | 1.4666 | 123 |
| Ethylene glycol ethyl ether | 192.3 | Sol | 1.4620 | 102 |
| Ethylene glycol n-butyl ether | 224.1 | Insol | 1.4604 | 87.6 |
| Diethylene glycol methyl ether | 240.1 | Sol | 1.4787 | 191 |
| Diethylene glycol ethyl ether | 251.1 | Sol | 1.4657 | 171 |
| Diethylene glycol n-butyl ether | 267.7 | Insol | 1.4615 | 106 |
| Propylene glycol methyl ether | 187.7 | Sol | 1.4614 | 203 |
| Dipropylene glycol methyl ether | 250.1 | Sol | 1.4593 | 222 |

EXAMPLE XII

Styrene (104.2 grams) and xylene (110 grams) were mixed in a 3-neck glass flask fitted with a mechanical stirrer, reflux condenser and dropping funnel. The flask was purged and blanketed with nitrogen, the contents heated to reflux and a solution of 105.8 grams of the half acid maleate of dipropylene glycol methyl ether in 30 grams of xylene and containing 1.55 grams of di-t-butyl peroxide and 1.55 grams of t-butyl-hydroperoxide was added continuously over 1 hour. The mixture remained clear through an additional 2.5 hour heating period. The percent solids was 50.9. After devolatilization in vacuo at 50° C. for 4 hours, a clear resinous product was obtained which had a viscosity of 1.45 cps. (10% in methyl ethyl ketone) and a Vicat softening temperature of 61° C.

EXAMPLE XIII

A reaction vessel as in Example XII was charged with 209.2 grams styrene and 350 grams xylene and heated to 105° C. From a dropping funnel a solution of 81.3 grams of the reaction product of equal moles of dibutylene glycol methyl ether and maleic anhydride in 70.0 grams of xylene with 1.4 grams each of di-t-butyl peroxide and t-butyl hydroperoxide was added uniformly over one hour and 25 minutes. The reaction temperature rose to 140° C. and leveled off as the mixture refluxed. Heating was continued for another 6.5 hours with the reaction mixture remaining very clear and slightly yellow.

The product solution was 37.7% solids and the polymeric portion exhibited an absolute viscosity of 1.28 cps. at 10% solids in methyl ethyl ketone.

EXAMPLE XIV

To 300 grams of the reaction product of maleic anhydride and diethylene glycol butyl ether were added 140 grams xylene, 4.5 grams t-butyl hydroperoxide, and 4.5 grams di-t-butyl peroxide. This solution was pumped uniformly over 98 minutes into a 3 liter flask which contained 900 grams of vinyl toluene and 660 grams xylene heated to 130° C. and which was purged and blanketed with nitrogen.

The reaction was terminated after a total reaction time of 7 hours. The resulting solution was exceptionally clear and slightly yellow; percent solids was 52.9%.

The sample of syrup devolatilized at 140° C. for about one hour to determine the percent solids was thermoset and could not be dissolved in methyl ethyl ketone. By diluting the original solution to 10% solids with MEK an absolute viscosity of 2.88 cps. was obtained.

The polymer solution in xylene was used as an adhesive to bond three-ply ¼ inch plywood test panels and paper. Wood to wood (w./w.), wood to paper (w./p.) and paper to paper (p./p.) adhesion were tested at room temperature overnight, 60° C. for 2.5 hours and 150° C. for one hour with the following results:

| Test | Cure | Observations |
|---|---|---|
| W./w. | Room Temp. | Fair bond. |
| W./p. | do | Good bond. |
| P./p. | do | Do. |
| W./w. | 60° C. | Fair bond, uncured. |
| W./p. | do | Very good bond. |
| P./p. | do | Excellent bond. |
| W./w. | 150° C. | Adequate bond. |
| W./p. | do | Very good bond. |
| P./p. | do | Unscorched bond. |

The same polymer solution was used for coating tin plated test panels. Flow-on and wetting of the test panel was observed to be especially good. The air dried film was clear and had a high gloss. After baking at 200° C. for 1 hour a 1.2 mil film had excellent mar resistance.

EXAMPLE XV

A solution of 75 weight percent vinyltoluene, 10% diethylene glycol methyl ether half ester of maleic acid (DM–AM) and 15% methyl ethyl ketone was fed continuously into a polymerization reactor similar to that illustrated by FIGURE 2 of the drawing in U.S. Patent 2,769,804. The polymerizer was maintained at about 165° C. A major portion of the polymerization mixture was recirculated through the polymerizer. A minor portion of the mixture from the polymerizer was passed to a devolatilizing extruder when it was heated to approximately 200 to 225° C. at 32 mm. absolute pressure to vaporize volatile components. The volatile materials thus separated from the copolymer were condensed and saved. The devolatilized copolymer, which constituted about 23 percent of the monomer-polymer effluent from the reactor, was extruded in continuous flow from the devolatilizing device and collected.

Start-up of the process was achieved by polymerizing styrene alone and then switching to the above feed solution. Change-over to steady state conditions was achieved in about 8 hours. The copolymer contained 0.77% volatiles and a 10% solution in MEK had an absolute viscosity of 4.55 cps. It was yellow colored but clear. On the basis of alcoholic KOH titration, and titration with aqueous KOH of the copolymer reacted with water in pyridine, the product contained 9.29 weight percent acid maleate and 6.35 percent maleic anhydride (87.34 mole percent vinyltoluene, 7.93 mole percent MA, 4.73 mole percent DM–AM). This copolymer was injection molded at a cylinder temperature of 425° F. Test specimens were found to possess an average tensile strength of 2000 p.s.i. and an elongation of 0.9%. The Vicat softening temperature was 107° C.

EXAMPLE XVI

Using the procedure as above, a feed of 5% maleic half ester of diethylene glycol monobutyl ether and 95% styrene was employed. The reactor temperature was maintained at 105° C. and the percent solids of the monomer-polymer effluent was 24.0%. By devolatilization of a test portion of the monomer-polymer syrup at 150° C. and 5 mm. pressure for 1 hour a water white, clear copolymer sample was recovered. This sample analyzed 12.4% of the acid maleate and 1.5% maleic anhydride. A 10% solution in MEK had a viscosity of 36 cps.

Continuous devolatilization and extrusion of the reactor product syrup at about 220° C. and 100 mm. yielded a clear strand that was cut into pellets and tested. Injection molded test specimens were made in a 10 gram laboratory molding machine at 400° F.

| | | |
|---|---|---|
| Maleic anhydride | wt. percent | 4.8 |
| Acid maleate | do | 1.6 |
| Viscosity (10% in MEK) | cps | 27.5 |
| Percent volatile | | 4.63 |
| Vicat softening temperature | ° C | 89 |
| Tensile strength | p.s.i. | 5660 |
| Percent elongation | | 2.4 |
| Impact strength | ft.-lbs./in. notch | 0.54 |

The cut pellets were dissolved in xylene at 20% solids to form a clear lacquer. This lacquer was brushed on a ¼ inch plywood test panel in three coats, sanding lightly between coats. The final finish was very clear and glossy. Flow-on and adhesion were excellent. The coating was hard with very good alcohol resistance and water resistance.

EXAMPLE XVII

A 25 gram sample of styrene-maleic anhdyride copolymer containing 16.4 weight percent maleic anhydride made by the process of copending application Ser. No. 33,376, filed June 2, 1960, was dissolved in 25 grams of toluene and 7.03 grams of diethylene glycol butyl ether was added. Zero time was taken to be when the polymer was in solution. The solution was reacted at 80° C. and periodical analysis of the reaction mixture was made by casting a film on rock salt and analyzing by infrared. Calculations on the conversion of anhydride to half ester were made by comparing the anhydride peak at 5.4μ with the styrene peak at 6.2μ. The following table gives the results:

| Time, hr. | 5.4/6.2 Ratio | Corrected Ratio [1] | Normalized Ratio | Mole Percent Reacted [2] |
|---|---|---|---|---|
| 0 | 1.730 | 1.594 | 1.000 | 0 |
| 21 | 1.189 | 1.053 | 0.658 | 34.2 |
| 46 | 0.766 | 0.630 | 0.394 | 60.6 |
| 70 | 0.573 | 0.437 | 0.274 | 72.6 |
| 142 | 0.376 | 0.240 | 0.150 | 85.0 |

[1] This is a correction for the ratio of 5.4/6.2 peaks in polystyrene which is 0.136.
[2] Mole percent reacted from zero time (to half ester).

The polymer films obtained were all clear and transparent.

EXAMPLE XVIII

Using the method of Example XV, a solution of 95 parts styrene, 5 parts maleic half ester of diethylene glycol monobutyl ether, 50 parts of xylene and 0.25 part each of di-t-butyl peroxide and t-butyl hydroperoxide was fed continuously to the reactor maintained at 140° C. After 16 hours of operation the effluent monomer-polymer-solvent solution at 57% solids (86% conversion) was crystal clear and nearly colorless. By vacuum devolatilization at 150° C., a transparent solid copolymer was obtained which contained 6.38 weight percent acid maleate by alcoholic base titration. The solution viscosity of the polymer was 1.55 cps. in methyl ethyl ketone solution at 10% solids. Continuous vacuum devolatilization was accomplished at about 220° C. in a device for continuous extrusion of the polymeric product. A transparent straw colored cut granule was obtained which contained 1.43% maleic anhydride and 1.75% acid maleate. To a 150 gram portion of the monomer-polymer-solvent solution from the reactor was added about 0.25 grams benzoyl peroxide and the polymerization was continued at 80° C. to substantially 100% conversion. This procedure also resulted in a water clear copolymer solution.

The following examples were run for comparative purposes to illustrate the nonhomogeneity, i.e., opacity of the polymer product and/or the insolubility of fractions of the polymer products in solvents such as acetone. The opacity and insolubility are believed to result from the nonuniform composition of the vinyl aromatic-maleic ester copolymer. This nonuniformity is particularly illustrated in Example XIX wherein the various fractions of the polymeric product are seen to have vastly different ratios of ester to vinyl aromatic compound.

EXAMPLE XIX 2000 grams styrene (19.212 moles) and 0.5 gram ditertiary butyl peroxide were charged into a 5 liter flask equipped with a stirrer. A nitrogen blanket was maintained in the flask, and the reaction mixture was heated to 100° C., after which a solution of 384 grams of the maleic half ester of diethylene glycol monobutyl ether (DB–AM) (1.4276 moles) and 560 grams (5.38 moles) of styrene was added at a uniform rate of 1.5 cc. per minute.

The addition took 10 hours and 40 minutes.

During the course of the reaction, samples of about 15 grams were removed every two hours and tested as shown in the following table:

| Cut | Time | Clarity | Diluted with acetone | Syrup precipitated in cold MeOH and dried at 70° C. | | |
|---|---|---|---|---|---|---|
| | | | | Percent Conv. | Weight Percent AM | Polymer in acetone |
| A | 2 | Clear | Insol. fraction | 4.77 | 5.38 | Insol. |
| B | 4 | do | Cloudy | 9.51 | 14.1 | Insol. frac. |
| C | 6 | do | Clear | 14.3 | 16.9 | Insol. frac. |
| D | 8 | do | do | 17.6 | 19.6 | Insol. frac. |
| E | 10 | Sl. hazy | do | 21.6 | 21.9 | Insol. frac. |
| F | [1] 12 | Hazy | do | 23.9 | 23.3 | Insol. frac. |

[1] After cooling.

Polymer F was pressed into a 1″ x 1″ x ⅛″ chip which was milky white and opaque. Polymer F had a viscosity (25° C. at 10% in MEK) of 34.7 cps. and contained 10.5 mole percent maleic ester.

EXAMPLE XXI

Following the teachings of the prior art the following mixture was heated at 50° C. for 16 hours.

| | G. |
|---|---|
| Styrene | 72.3 |
| Diethylene glycol monobutyl ether maleic ester (DB–AM) | 27.7 |
| Xylene | 100.0 |
| di-t-Butyl peroxide | 0.25 |
| t-Butyl hydroperoxide | 0.25 |

The reaction product was poured into a solution of 250 ml. methanol and 50 ml. of water. An emulsion formed. No solid product separated indicating no polymerization occurred.

EXAMPLE XXII

The experiment of Example XXI was repeated except for using 0.5 g. benzoyl peroxide as the catalyst. The resulting product was diluted with a mixture of 250 ml. methanol and 50 ml. water, the insoluble material separated and dried under vacuum for 3 hours at 60° C. A solution viscosity could not be obtained because the dried polymer was insoluble in MEK. The percent conversion was 10.6%. The product contained 29 mole percent DB–AM. A 1″ x 1″ x ⅛″ chip was molded from this product and was very hazy.

I claim:

1. A transparent, homogeneous copolymer of a member of the group consisting of (a) from 80 to 98 mole percent of at least one monovinyl aromatic compound chemically combined with from 2 to 20 mole percent of maleic acid which is partially esterified with a member of the group consisting of alkyl alcohols containing from 1 to 18 carbon atoms and cycloalkyl alcohols and (b) from 65 to 98 mole percent of at least one monovinyl aromatic compound chemically combined with from 35 to 2 mole percent of an alkylene oxide monoether alcohol partial ester of maleic acid wherein said monoether alcohol has the formula $R(OC_nH_{2n})_mOH$ wherein $n$ is an integer from 2 to 4, $m$ is an integer from 1 to 2 and R is a member of the group consisting of alkyl radicals containing 1 to 8 carbon atoms monocycloalkyl radicals, and mononuclear and alkyl substituted mononuclear aromatic radicals wherein the substituents contain up to 12 carbon atoms.

2. A transparent, homogeneous copolymer consisting essentially of from 80 to 98 mole percent of at least one monovinyl aromatic compound chemically combined with from 2 to 20 mole percent of maleic acid which is from 10 to 60 percent esterified with a member of the group consisting of alkyl alcohols containing from 1 to 18 carbon atoms, and cycloalkyl alcohols.

3. Copolymer of claim 2 wherein the vinyl aromatic compound is styrene.

4. Copolymer of claim 2 wherein the alcohol is isooctyl alcohol.

5. A method of preparing transparent, homogeneous copolymers of vinyl aromatic compounds and partially esterified maleic acid wherein the maleic acid is esterified with a member of the group consisting of alkyl alcohols containing from 1 to 18 carbon atoms and cycloalkyl alcohols, comprising the linear addition of from 90 to 65 weight percent of a mixture of (1) the partially esterified maleic acid and (2) catalyst and, optionally, (3) a solvent therefor to a solution of the vinyl aromatic monomer and from 10 to 35 weight percent of the partially esterified maleic acid and catalyst in a solvent therefor, said solution being preheated to a temperature of from 90° to 200° C.

6. Method of claim 5 wherein the mixture of partially esterified maleic acid and catalyst is added at a linear rate such that the addition is completed when the polymerization has reached from 70 to 85 percent conversion of all monomers to copolymeric product.

7. Method of claim 5 wherein the solvent for the partially esterified maleic acid and catalyst is an alcohol.

8. Method of claim 7 wherein the alcohol is the same alcohol which is used to esterify the maleic acid.

9. Method of claim 5 wherein the solvent is a member of the group consisting of benzene, toluene, xylene, methyl ethyl ketone, methyl isobutyl ketone and mixtures thereof.

10. Method of shaping a high melt viscosity polymer which has been prepared by the method of claim 6 and contains a heat labile plasticizing alcohol chemically combined as a half ester of a 1,2-dicarboxylic acid in the polymer molecule comprising heating said polymer to a temperature above about 200° C. to at least partially deesterify whereby said polymer is plasticized, and thereafter shaping said polymer and cooling to reesterify.

11. Method of preparing copolymers containing maleic anhydride which comprises heating a maleic half ester-containing copolymer which has been prepared by the method of claim 6 above about 200° C. to deesterify and remove at least a portion of the combined alcohol.

12. A copolymer of from 98 to 65 mole percent of a monovinyl aromatic monomer and, correspondingly, from 2 to 35 mole percent of an alkylene oxide mono ether alcohol partial ester of maleic acid, said mono ether alcohol having the formula:

$R(OC_nH_{2n})_mOH$ wherein $n$ is an integer from 2 to 4 inclusive, $m$ is an integer from 1 to 2 inclusive, and R is a member of the group consisting of alkyl radicals containing from 1 to 8 carbon atoms, monocycloalkyl, and mononuclear aromatic radicals and alkyl substituted mononuclear aromatic radicals wherein the substituents contain up to 12 carbon atoms, said copolymer having an essentially uniform composition.

13. Copolymer of claim 12 wherein the maleic acid is esterified to between 10 and 60 mole percent.

14. Copolymer of claim 13 wherein the maleic acid is esterified to between 30 and 50 mole percent.

15. Copolymer of claim 12 wherein the partial ester is present in from 5 to 20 mole percent.

16. Copolymer of claim 12 wherein the vinyl aromatic monomer is styrene.

17. Copolymer of claim 12 wherein the vinyl aromatic monomer is vinyl toluene.

18. A method of preparing transparent, homogeneous copolymers of monovinyl aromatic compounds and partially esterified maleic acid wherein the maleic acid is esterified with an alkylene oxide mono ether alcohol comprising the linear addition of from 90 to 65 weight percent of a mixture of (1) the partially esterified maleic acid and (2) catalyst and, optionally, (3) a solvent therefor to a solution of the vinyl aromatic monomer and from 10 to 35 weight percent of the partially esterified maleic acid and catalyst in a solvent therefor at a temperature of from 90° to 200° C.

19. Copolymer of claim 12 wherein a 10 percent solution in methyl ethyl ketone has a viscosity of less than 3.0 cps.

20. Copolymer of claim 19 having a viscosity of less than 1.6 cps.

21. A method of preparing transparent, homogeneous copolymers of vinyl aromatic compounds and partially esterified maleic acid wherein the maleic acid is esterified with a member of the group consisting of alkyl alcohols containing from 1 to 18 carbon atoms and cycloalkyl alcohols, comprising the linear addition of from 100 to 65 weight percent of a mixture of (1) the partially esterified maleic acid and (2) catalyst and, optionally, (3) a solvent therefor to a solution of the vinyl aromatic monomer and from 0 to 35 weight percent of the partially esterified maleic acid in a solvent therefor, said solution being preheated to a temperature of from 90° to 200° C.

22. A method of preparing transparent, homogeneous copolymers of monovinyl aromatic compounds and partially esterified maleic acid wherein the maleic acid is esterified with an alkylene oxide mono ether alcohol comprising the linear addition of from 100 to 65 weight percent of a mixture of (1) the partially esterified maleic acid and (2) catalyst and, optionally, (3) a solvent therefor to a solution of the vinyl aromatic monomer and from 0 to 35 weight percent of the partially esterified maleic acid in a solvent therefor at a temperature of from 90° to 200° C.

References Cited

UNITED STATES PATENTS

| 2,537,016 | 1/1951 | Barrett | 260—78.5 |
| 2,912,413 | 11/1959 | Baer | 260—78.5 |
| 3,004,958 | 10/1961 | Berens | 260—78.5 |
| 3,207,718 | 9/1965 | Zimmerman et al. | 260—78.5 X |
| 2,954,358 | 9/1960 | Hurwitz | 260—29.6 |

FOREIGN PATENTS 1,024,238  2/1958  Germany.

JOSEPH L. SCHOFER, Primary Examiner.

JOHN KIGHT, Assistant Examiner.

U.S. Cl. X.R.

260—32.8, 33.6, 34.2; 117—161